United States Patent
Minamiyama et al.

(10) Patent No.: US 10,134,494 B2
(45) Date of Patent: Nov. 20, 2018

(54) INSTALLATION DEVICE OF REACTOR REPAIR DEVICE AND METHOD

(71) Applicant: MITSUBISHI HEAVY INDUSTRIES, LTD., Tokyo (JP)

(72) Inventors: Akio Minamiyama, Tokyo (JP); Yutaka Nishitsuji, Tokyo (JP); Koji Okimura, Tokyo (JP); Kazuyuki Hinami, Tokyo (JP); Tomochika Hamamoto, Tokyo (JP); Takao Konno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 465 days.

(21) Appl. No.: 14/762,562

(22) PCT Filed: Jan. 27, 2014

(86) PCT No.: PCT/JP2014/051717
§ 371 (c)(1),
(2) Date: Jul. 22, 2015

(87) PCT Pub. No.: WO2014/119523
PCT Pub. Date: Aug. 7, 2014

(65) Prior Publication Data
US 2015/0364224 A1    Dec. 17, 2015

(30) Foreign Application Priority Data
Jan. 31, 2013    (JP) ................................ 2013-017881

(51) Int. Cl.
*G21C 19/20*    (2006.01)
*G21C 19/02*    (2006.01)
(Continued)

(52) U.S. Cl.
CPC ........... *G21C 19/207* (2013.01); *G21C 17/01* (2013.01); *G21C 19/02* (2013.01); *G21C 13/036* (2013.01);
(Continued)

(58) Field of Classification Search
CPC ...... G21C 13/036; G21C 17/01; G21C 19/02; G21C 19/207; Y10T 29/49719; Y10T 29/531
See application file for complete search history.

(56) References Cited

U.S. PATENT DOCUMENTS 4,645,637 A * 2/1987 Bauer .................... G21C 17/01
376/249
4,668,981 A * 5/1987 Egger .................... G21C 17/01
348/83

(Continued)

FOREIGN PATENT DOCUMENTS

JP    53-124879 A    10/1978
JP    4-279897 A    10/1992
(Continued)

OTHER PUBLICATIONS

Translation of Written Opinion dated Apr. 28, 2014, issued in counterpart International Application No. PCT/JP2014/051717 (4 pages).

(Continued)

*Primary Examiner* — Jacob Cigna
(74) *Attorney, Agent, or Firm* — Westerman, Hattori, Daniels & Adrian, LLP

(57) ABSTRACT

In an installation device of a reactor repair device and a method, an installation pole (111) connected with an upper portion of a water jet peening device (101), a lifting device (112) that can suspend and support an upper portion of the installation pole (111) and can lift the installation pole (111)

(Continued)

from a work floor (121), a moving device (113) that can move the lifting device (112) in two directions intersecting in a horizontal direction, and a position adjustment device (114) that can move the installation pole (111) in the horizontal direction in a state where the installation pole (111) is supported by the lifting device (112).

3 Claims, 16 Drawing Sheets

(51) Int. Cl.
    *G21C 17/01*     (2006.01)
    *G21C 13/036*     (2006.01)

(52) U.S. Cl.
    CPC ........ *Y10T 29/49719* (2015.01); *Y10T 29/531* (2015.01)

(56) References Cited

U.S. PATENT DOCUMENTS

| | | | |
|---|---|---|---|
| 4,716,010 A * | 12/1987 | Gallo | B23P 19/02 29/407.09 |
| 4,826,651 A * | 5/1989 | Day | G21C 19/18 33/502 |
| 6,058,153 A | 5/2000 | Kurosawa et al. | |
| 6,425,276 B1 | 7/2002 | Hirano et al. | |
| 8,687,758 B2 * | 4/2014 | Ohmori | G21C 17/003 376/260 |
| 2011/0051878 A1 * | 3/2011 | Ohmori | G21C 17/003 376/260 |
| 2012/0114090 A1 | 5/2012 | Matsumoto et al. | |

FOREIGN PATENT DOCUMENTS

| | | | |
|---|---|---|---|
| JP | 5-333193 A | | 12/1993 |
| JP | 06-329388 A | | 11/1994 |
| JP | 2001-108784 A | | 4/2001 |
| JP | 2002-243889 A | | 8/2002 |
| JP | 3088153 U | | 8/2002 |
| JP | 2003-337192 A | | 11/2003 |
| JP | 2003337192 A | * | 11/2003 |
| JP | 2004-163213 A | | 6/2004 |
| JP | 2004-264206 A | | 9/2004 |
| JP | 2006-201141 A | | 8/2006 |
| JP | 2008-115007 A | | 5/2008 |
| JP | 2012-103253 A | | 5/2012 |

OTHER PUBLICATIONS

Extended European Search Report dated Feb. 8, 2016, issued in counterpart European Application No. 14746031.5 (9 pages).
Office Action dated Sep. 6, 2016, issued in counterpart Japanese Patent Application No. 2013-017881, with English translation. (7 pages).
Notice of Allowance dated Nov. 29, 2016, issued in counterpart Korean Patent Application No. 10-2015-7020076, with English translation. (5 pages).
International Search Report dated Apr. 28, 2014, issued in counterpart application No. PCT/JP2014/051717 (2 pages).
Written Opinion dated Apr. 28, 2014, issued in counterpart application No. PCT/JP2014/051717 (4 pages).
Office Action dated Feb. 28, 2017, issued in counterpart Japanese Patent Application No. 2013-017881, with English translation. (5 pages).

\* cited by examiner

INSTALLATION DEVICE OF REACTOR REPAIR DEVICE AND METHOD

FIELD

The present invention relates to an installation device of a reactor repair device and a method, for installing, in a reactor vessel, a repair device that repairs a nozzle provided in the reactor vessel and the periphery of the nozzle.

BACKGROUND

For example, an atomic power plant including a pressurized water reactor (PWR) uses light water as a reactor coolant and a neutron moderator, keeps the light water as high-temperature and high-pressure water that does not boil throughout an entire reactor internal, sends the high-temperature and high-pressure water to a steam generator to generate steam by heat exchange, and sends the steam to a turbine generator to generate power.

In such an atomic power plant, the pressurized water reactor needs to have periodic checks of various structures in order to secure sufficient safety and reliability. Then, when the checks are conducted and failure is found, a necessary place related to the failure is repaired. For example, in the pressurized water reactor, a reactor vessel main body is provided with a large number of instrumentation nozzles that penetrate a lower end plate. In each of the instrumentation nozzles, an in-core instrumentation guide tube is fixed to an in-core side upper end portion, and a conduit tube is connected to an ex-core side lower end portion. Further, a neutron flux detector that can measure a neutron flux can be inserted from the instrumentation nozzle to a reactor internal (fuel assembly) through the in-core instrumentation guide tube with the conduit tube.

The instrumentation nozzle is configured such that an in-core instrumentation cylinder is fit into a mounting hole of the reactor vessel main body and is welded. Therefore, tensile stress may remain in the in-core instrumentation cylinder, a welded portion of the in-core instrumentation cylinder, and its peripheral portions, and a probability of occurrence of stress corrosion cracking becomes high due to long-term use. Therefore, conventionally, there is a water jet peening technology, in which tensile residual stress on a surface is improved into compressive residual stress, so that the stress corrosion cracking is prevented. The water jet peening is to jet high-pressure water containing cavitation bubbles to a surface of a metal member in water to improve the tensile residual stress on the surface of the metal member into the compressive residual stress. As such a water jet peening device, there is one described in Patent Literature 1 below, for example.

CITATION LIST

Patent Literature

Patent Literature 1: Japanese Laid-open Patent Publication No. 2006-201141

SUMMARY

Technical Problem

When the water jet peening is performed for an inner surface of a reactor vessel, a water jet peening device is mounted to an instrumentation nozzle (in-core instrumentation cylinder) and work is performed. In this case, a supporting device is mounted to a lower portion of the water jet peening device, and the supporting device holds the in-core instrumentation cylinder from an outside, so that the water jet peening device is mounted to the instrumentation nozzle. However, the reactor vessel is filled with water, and an operator stands by on a work floor positioned above the reactor vessel. Therefore, the operator needs to operate a crane from the work floor to lower the water jet peening device, and mounts the water jet peening device to the instrumentation nozzle. Therefore, there is a problem of difficulty in positioning of the water jet peening device.

The present invention solves the above problem, and an objective is to provide an installation device of a reactor repair device and a method that can improve workability by easily mounting the reactor repair device to a predetermined position.

Solution to Problem

According to an aspect of the present invention, an installation device of a reactor repair device that installs the reactor repair device to an instrumentation nozzle provided in a hemispherical portion of a reactor vessel, includes: an installation jig configured to be connected to an upper portion of the reactor repair device; a lifting device configured to be able to suspend and support an upper portion of the installation jig and to lift the installation jig from a work floor; a moving device configured to be able to move the lifting device in two directions intersecting in a horizontal direction; and a position adjustment device configured to be able to move the installation jig in the horizontal direction in a state where the installation jig is supported by the lifting device.

Therefore, the reactor repair device is suspended and supported by the lifting device on the work floor through the installation jig connected to the upper portion, is temporarily positioned by being lowered by the lifting device and being moved in the horizontal direction by the moving device, and is finally actually positioned by being moved by the position adjustment device in the horizontal direction in a state where the installation jig is supported by the lifting device. Then, the reactor repair device is lowered to be installed to the instrumentation nozzle. Therefore, the reactor repair device can be easily mounted to a predetermined position from the upper work floor, and the workability can be improved.

Advantageously, in the installation device of a reactor repair device, the position adjustment device is able to move the installation jig by supporting a position of the installation jig, the position being lower than a supported position of the installation jig by the lifting device.

Therefore, the positioning of the reactor repair device is performed by supporting the position of the installation jig, the position being lower than the supported position of the installation jig by the lifting device and moving the reactor repair device. Therefore, the reactor repair device is positioned in a state where the weight is supported by the lifting device, and dropping of the reactor repair device and the like are prevented and safety can be improved.

Advantageously, in the installation device of a reactor repair device, an air balancer that reduces a weight of the reactor repair device is provided to the installation jig.

Therefore, the weight of the reactor repair device is reduced by the air balancer. Therefore, the reactor repair device can be slightly lowered, collision of the reactor repair device and the instrumentation nozzle is prevented, and the reactor repair device can be appropriately installed to the instrumentation nozzle.

Advantageously, in the installation device of a reactor repair device, a suspension switch metal fitting is provided to the installation jig, the suspension switch metal fitting including a plurality of suspension portions, and being able to switch suspension of the reactor repair device suspended and supported through the installation jig to the lifting device.

Therefore, the suspension switch metal fitting is provided with the plurality of suspension portions. Therefore, for example, when suspension of the reactor repair device is switched from the crane to the lifting device, the weight of the reactor repair device is supported by the crane and the lifting device by the suspension switch metal fitting, and the dropping of the reactor repair device and the like are prevented and safety can be improved.

Advantageously, in the installation device of a reactor repair device, the position adjustment device includes a guide rail laid and provided on the work floor along one direction into which the lifting device is horizontally moved, a first moving body freely movable along the guide rail, and a holding member provided to the first moving body and being able to hold the installation jig.

Therefore, the holding member that can hold the installation jig is freely movable with the guide rail along the one direction into which the lifting device is moved through the first moving body. Therefore, the operator can perform positioning of the reactor repair device only by moving the first moving body, and the workability can be improved.

Advantageously, in the installation device of a reactor repair device, the holding member is able to hold two places of the installation jig in a longitudinal direction.

Therefore, the holding member holds two places of the installation jig, and thus a tilt of the installation jig is suppressed and stable positioning of the reactor repair device can be performed.

Advantageously, in the installation device of a reactor repair device, the position adjustment device includes a camera being able to capture repair work by the reactor repair device, a second moving body freely movable along the guide rail, and a monitor provided on the second moving body and being able to display a picture of the camera.

Therefore, the monitor on which positioning adjustment work by the reactor repair device is displayed is freely movable with the guide rail along the one direction into which the lifting device is moved through the second moving body. Therefore, the operator can perform positioning of the reactor repair device while moving the monitor to an appropriate position with the second moving body, and the workability can be improved.

Advantageously, in the installation device of a reactor repair device, a temporary placing frame that suspends and supports the upper portion of the reactor repair device is provided.

Therefore, the installation jig can be connected in a state where the upper portion of the reactor repair device is suspended and supported by the temporary placing frame. Therefore, the long installation jig and the reactor repair device can be easily conveyed into the reactor.

Advantageously, in the installation device of a reactor repair device, a plurality of sets of the lifting devices, the moving devices, and the position adjustment devices is arranged on the work floor to face each other in the horizontal direction.

Therefore, repair work can be performed in a plurality of places with the plurality of reactor repair device at the same time, and a work time can be shortened.

Advantageously, in the installation device of a reactor repair device, the reactor repair device includes a water jet peening device.

Therefore, the water jet peening device can be easily mounted to a predetermined position, and the workability can be improved.

According to another aspect of the present invention, a method of installing a reactor repair device to an instrumentation nozzle provided in a hemispherical portion of a reactor vessel, includes the steps of: suspending and supporting an upper portion of an installation jig connected to an upper portion of the reactor repair device from a work floor; performing temporary positioning of the reactor repair device with respect to the instrumentation nozzle by moving the installation jig in two directions intersecting in a horizontal direction; performing actual positioning of the reactor repair device with respect to the instrumentation nozzle by slightly moving the installation jig in the horizontal direction; and mounting the reactor repair device to the instrumentation nozzle by lowering the reactor repair device through the installation jig.

Therefore, positioning can be performed by moving the reactor repair device in the horizontal direction, and the reactor repair device can be installed to the instrumentation nozzle by lowering the reactor repair device. Therefore, the reactor repair device can be easily mounted to a predetermined position from the upper work floor, and the workability can be improved.

Advantageously, the method of installing a reactor repair device, includes successively performing the actual positioning and the mounting of the reactor repair device with respect to the instrumentation nozzle by slightly moving the reactor repair device in the horizontal direction while lowering the reactor repair device.

Therefore, the reactor repair device can be easily and highly precisely installed to the instrumentation nozzle.

Advantageously, the method of installing a reactor repair device includes suspending and supporting the reactor repair device by a first lifting device through the installation jig, and moving the reactor repair device to a predetermined position, and then switching suspension of the installation jig to a second lifting device while keeping a load of the reactor repair device supported by the first lifting device through the installation jig.

Therefore, when suspension of the reactor repair device is switched from the first lifting device to the second lifting device, the suspension is switched to the second lifting device while keeping the load of the reactor repair device supported by the first lifting device. Therefore, the weight of the reactor repair device is supported by the two lifting devices at the same time, and the dropping of the reactor repair device and the like are prevented and safety can be improved.

Advantageous Effects of Invention

According to the installation device of a reactor repair device and the method of the present invention, positioning can be performed by moving the reactor repair device in the horizontal direction by the position adjustment device, and the reactor repair device can be installed to the instrumentation nozzle by lowering the reactor repair device by the lifting device. Therefore, the reactor repair device can be easily mounted to a predetermined position from the upper work floor, and the workability can be improved.

BRIEF DESCRIPTION OF DRAWINGS

FIG. 10-1 is a schematic diagram illustrating a method of positioning a horizontal position of a reactor repair device.

FIG. 10-2 is a schematic diagram illustrating the method of positioning a horizontal position of a reactor repair device.

FIG. 10-3 is a schematic diagram illustrating the method of positioning a horizontal position of a reactor repair device.

FIG. 10-4 is a schematic diagram illustrating the method of positioning a horizontal position of a reactor repair device.

DESCRIPTION OF EMBODIMENTS

Hereinafter, favorable embodiments of an installation device of a reactor repair device and a method according to the present invention will be described in detail with reference to the appended drawings. Note that the present invention is not limited by these embodiments, and when there is a plurality of embodiments, the present invention includes configurations of combination of the embodiments.

First Embodiment

Figure 13:
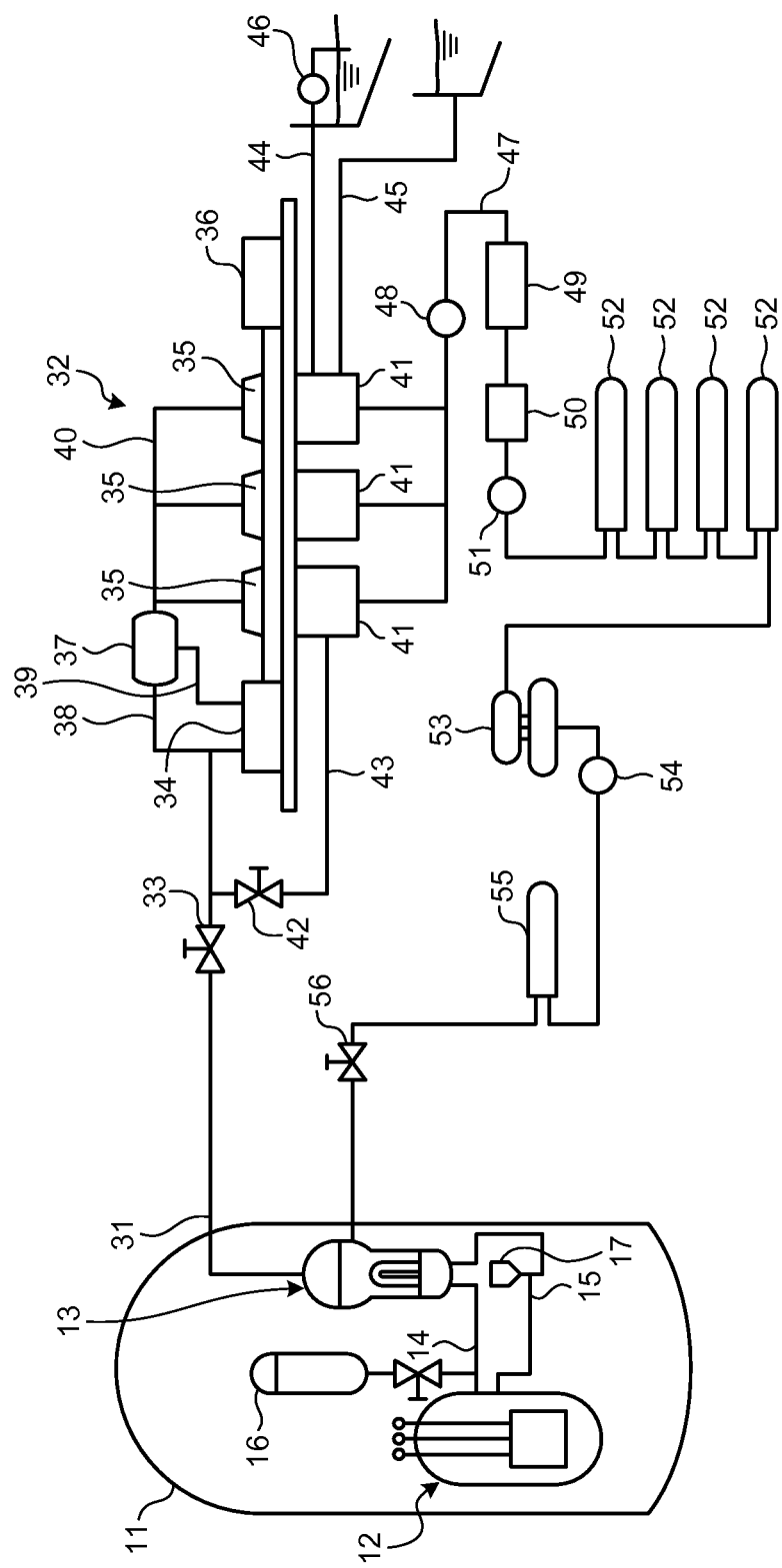
FIG. 13 is a schematic configuration diagram of an atomic power plant.
Figure 14:
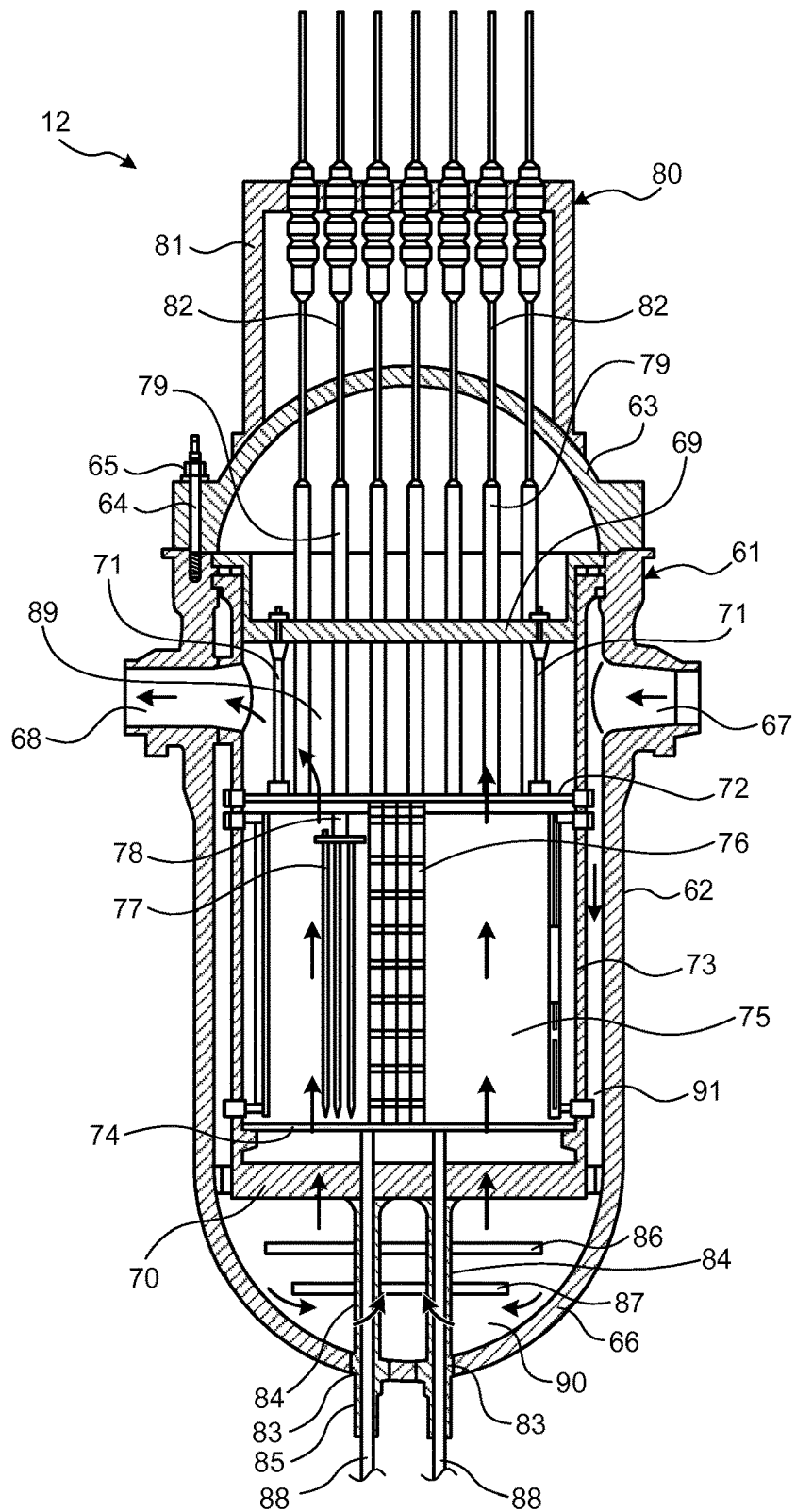
FIG. 14 is a vertical cross-sectional view illustrating a pressurized water reactor.
Figure 15:
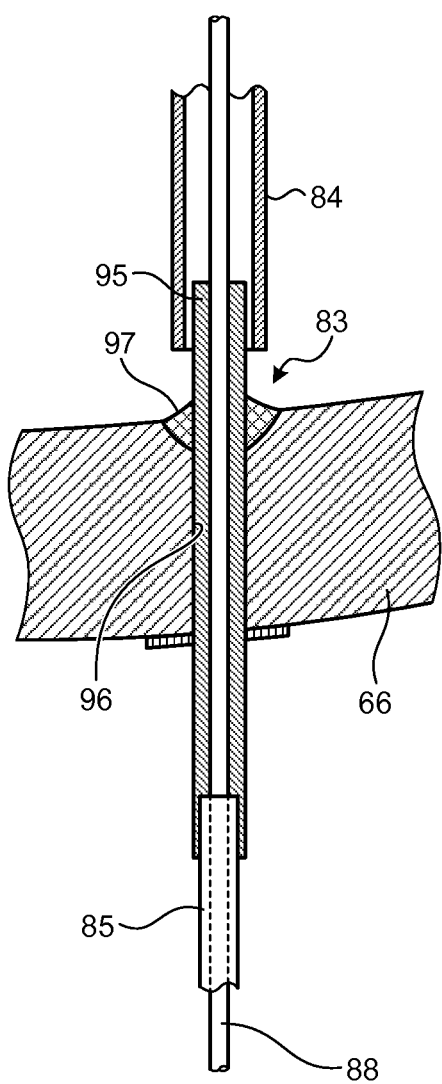
FIG. 15 is a cross-sectional view illustrating an instrumentation nozzle of a reactor vessel.

FIG. 13 is a schematic configuration diagram of an atomic power plant, FIG. 14 is a vertical cross-sectional view of a pressurized water reactor, and FIG. 15 is a cross-sectional view illustrating an instrumentation nozzle of a reactor vessel.

A reactor of the first embodiment is a pressurized water reactor that uses light water as a reactor coolant and a neutron moderator, keeps the light water as high-temperature and high-pressure water that does not boil throughout an entire reactor internal, sends the high-temperature and high-pressure water to a steam generator to generate steam by heat exchange, and sends the steam to a turbine generator to generate power.

In the atomic power plant including the pressurized water reactor of the first embodiment, as illustrated in FIG. 13, a containment 11 stores a pressurized water reactor 12 and a steam generator 13. The pressurized water reactor 12 and the steam generator 13 are connected through high-temperature side supply piping 14 and low-temperature side supply piping 15. The high-temperature side supply piping 14 is provided with a pressurizer 16, and the low-temperature side supply piping 15 is provided with a primary cooling water pump 17. In this case, the light water is used as a moderator and a primary cooling water (coolant), and a primary cooling system is controlled to maintain a high-pressure state of about 150 to 160 atmospheric pressure by the pressurizer 16 in order to suppress boiling of the primary cooling water in a reactor internal portion.

Therefore, in the pressurized water reactor 12, the light water is heated as the primary cooling water with low-enriched uranium or MOX as fuel (nuclear fuel), and the high-temperature primary cooling water is sent to the steam generator 13 through the high-temperature side supply piping 14 in a state where the high-temperature primary cooling water is maintained to have a predetermined high pressure by the pressurizer 16. In the steam generator 13, heat exchange is performed between the high-temperature and high-pressure primary cooling water and secondary cooling water, and the cooled primary cooling water is returned to the pressurized water reactor 12 through the low-temperature side supply piping 15.

The steam generator 13 is connected with a steam turbine 32 through piping 31 that supplies the heated secondary cooling water, that is, steam, and the piping 31 is provided with a main steam isolation valve 33. The steam turbine 32 includes a high-pressure turbine 34 and a low-pressure turbine 35, and is connected with a generator (power generator) 36. Further, a moisture separator and reheater 37 is provided between the high-pressure turbine 34 and the low-pressure turbine 35, and cooling water branch piping 38 branching from the piping 31 is connected to the moisture separator and reheater 37. The high-pressure turbine 34 and the moisture separator and reheater 37 are connected with a low-temperature reheating pipe 39, and the moisture separator and reheater 37 and the low-pressure turbine 35 are connected with a high-temperature reheat pipe 40.

Further, the low-pressure turbine 35 of the steam turbine 32 includes a condenser 41, and the condenser 41 is connected with turbine bypass piping 43 including a bypass valve 42 from the piping 31, and is connected with an intake pipe 44 and a drain pipe 45 that supplies and discharges the cooling water (for example, sea water). The intake pipe 44 includes a circulation water pump 46, and the other end portion of the intake pipe 44 is arranged in the sea together with the drain pipe 45.

Then, the condenser 41 is connected with piping 47, and is connected with a condensate pump 48, a grand condenser 49, a condensate demineralizer 50, a condensate booster pump 51, and a low-pressure supply water heater 52. Further, the piping 47 is connected with a deaerator 53, and provided with a main feed water pump 54, a high-pressure supply water heater 55, and a main feed water control valve 56.

Therefore, the steam generated by the heat exchange with the high-temperature and high-pressure primary cooling water in the steam generator 13 is sent to the steam turbine 32 (from the high-pressure turbine 34 to the low-pressure turbine 35) through the piping 31, and the steam turbine 32 is driven with the steam and the power is generated by the generator 36. At this time, the steam from the steam generator 13 drives the high-pressure turbine 34, then moisture contained in the steam is removed in the moisture separator and reheater 37 and the steam is heated, and then the steam drives the low-pressure turbine 35. The steam that has driven the steam turbine 32 is cooled in the condenser 41 using sea water and becomes condensate, and is returned to the steam generator 13 through the grand condenser 49, the condensate demineralizer 50, the low-pressure supply water heater 52, the deaerator 53, the high-pressure supply water heater 55, and the like.

In the pressurized water reactor 12 of the atomic power plant configured as described above, as illustrated in FIG. 14, a reactor vessel 61 is configured from a reactor vessel main body 62 and a reactor vessel head (upper end plate) 63 mounted on the reactor vessel main body 62 so as to allow an in-core structure to be inserted in the reactor vessel 61. The reactor vessel head 63 is fixed to the reactor vessel main body 62 with a plurality of stud bolts 64 and nuts 65 in an openable/closable manner.

An upper portion of the reactor vessel main body 62 can open by removal of the reactor vessel head 63, and a lower portion has a cylindrical shape blocked with a lower end plate 66 having a semispherical shape. An inlet nozzle 67 that supplies the light water (coolant) as the primary cooling water, and an outlet nozzle 68 that discharges the light water are formed in upper portions of the reactor vessel main body 62. Further, a water pouring nozzle (not illustrated) is separately formed from the inlet nozzle 67 and the outlet nozzle 68 in the reactor vessel main body 62.

An upper core support 69 is fixed above the inlet nozzle 67 and the outlet nozzle 68, and a lower core support 70 is positioned and fixed in the vicinity of a lower end plate 66, inside the reactor vessel main body 62. The upper core support 69 and the lower core support 70 have a disk-like shape, and a large number of flow holes (not illustrated) is formed in the upper core support 69 and the lower core support 70. Then, the upper core support 69 is connected with an upper core support plate 72 in which a large number of flow holes (not illustrated) is formed, through a plurality of core support rods 71.

A core barrel 73 that forms a cylindrical shape is arranged with a predetermined gap with an inner wall surface in the reactor vessel main body 62. An upper portion of the core barrel 73 is connected with the upper core support plate 72, and a lower portion is connected with a lower core support plate 74 that forms a disk-like shape and in which a large number of flow holes (not illustrated) is formed. Then, the lower core support plate 74 is supported by the lower core support 70. That is, the core barrel 73 is suspended and supported by the lower core support 70 of the reactor vessel main body 62.

A reactor internal 75 is formed of the upper core support plate 72, the core barrel 73, and the lower core support plate 74, and a large number of fuel assemblies 76 is arranged in the reactor internal 75. The fuel assembly 76 is configured such that, although not illustrated, a large number of fuel rods is bundled with a support grid in a grid-like manner, and an upper nozzle is fixed to an upper end portion, and a lower nozzle is fixed to a lower end portion. Further, a large number of control rods 77 is arranged in the reactor internal 75. Upper end portions of the large number of control rods 77 are put together, and serve as a control rod cluster 78, and can be inserted into the fuel assemblies 76. A larger number of control rod cluster guide tubes 79 is fixed to the upper core support 69 by penetrating the upper core support 69, and lower end portions of the control rod cluster guide tubes 79 are extended to the control rod cluster 78 in the fuel assemblies 76.

An upper portion of the reactor vessel head 63 that configures the reactor vessel 61 forms a semispherical shape, and the reactor vessel head 63 is provided with a control rod drive device 80 of a magnetic jack that is housed in a housing 81 integrally formed with the reactor vessel head 63. Upper end portions of the large number of control rod cluster guide tubes 79 are extended to the control rod drive device 80, and control rod cluster drive shafts 82 are extended from the control rod drive device 80, pass through the control rod cluster guide tubes 79, are extended to the fuel assemblies 76, and can hold the control rod cluster 78.

The control rod drive device 80 is extended and provided in an up and down direction, and is connected with the control rod cluster 78. The control rod drive device 80 controls an output of the reactor by moving, up and down, with the magnetic jack, the control rod cluster drive shafts 82 having a plurality of peripheral grooves arranged and provided in the surfaces in a longitudinal direction with equal pitches.

Further, the reactor vessel main body 62 is provided with a large number of instrumentation nozzles 83 that penetrates the lower end plate 66. An in-core side upper end portion of each instrumentation nozzle 83 is connected with an in-core instrumentation guide tube 84, and an ex-core side lower end portion is connected with a conduit tube 85. Upper end portions of the in-core instrumentation guide tubes 84 are connected with the lower core support 70, and upper and lower connection plates 86 and 87 for suppressing vibration are attached to the in-core instrumentation guide tubes 84. A neutron flux detector (not illustrated) that can measure a neutron flux is mounted on thimble tubes 88, and the thimble tubes 88 pass through the instrumentation nozzles 83 and the in-core instrumentation guide tubes 84 from the conduit tubes 85, penetrate the lower core support plate 74, and can be inserted to the fuel assemblies 76.

Therefore, the control rod cluster drive shafts 82 are moved by the control rod drive device 80 and the control rods 77 are pulled out of the fuel assemblies 76 by a predetermined amount, so that nuclear fission in the reactor internal 75 is controlled. The light water filled in the reactor vessel 61 is heated by generated thermal energy, and the high-temperature light water is discharged through the outlet nozzle 68 and is sent to the steam generator 13, as described above. That is, the nuclear fuel that configures the fuel assemblies 76 performs the nuclear fission to release neutrons, and the light water as the moderator and the primary cooling water decreases kinetic energy of the released high-pressure neutrons, causes the neutrons to become thermal neutrons, facilitates new nuclear fission, and takes generated heat to perform cooling. Meanwhile, the number of neutrons generated in the reactor internal 75 is adjusted by inserting the control rods 77 to the fuel assemblies 76. Further, the reactor can be urgently stopped by fully inserting the control rods 77 to the fuel assemblies 76.

Further, an upper plenum 89 communicating into the outlet nozzle 68 is formed above the reactor internal 75, and a lower plenum 90 is formed below the reactor internal 75, in the reactor vessel 61. Then, a downcomer portion 91 communicating into the inlet nozzle 67 and the lower plenum 90 is formed between the reactor vessel 61 and the core barrel 73. Therefore, the light water flows through the inlet nozzle 67 into the reactor vessel main body 62, flows down in the downcomer portion 91 to reach the lower plenum 90, is upwardly guided along a spherical inner surface of the lower plenum 90 and rises, passes through the lower core support 70 and the lower core support plate 74, and then flows into the reactor internal 75. The light water having flown into the reactor internal 75 absorbs the thermal energy generated from the fuel assemblies 76 that configure the reactor internal 75 to cool the fuel assemblies 76, becomes to have a high temperature, passes through the upper core support plate 72, rises to the upper plenum 89, and is discharged passing through the outlet nozzle 68.

In the reactor vessel 61 configured as described above, as illustrated in FIG. 15, the instrumentation nozzle 83 is configured such that the in-core instrumentation cylinder 95 is fit into a mounting hole 96 formed in the lower end plate 66 of the reactor vessel main body 62, and an upper end portion of the in-core instrumentation cylinder 95 is fixed to an inner surface of the lower end plate 66 by welding (groove welded portion 97). The reactor vessel main body 62 is configured such that stainless steel is subjected to buttered welding on an inner surface of low alloy steel serving as a base material. The in-core instrumentation cylinder 95 made of a nickel-base alloy is welded (groove welded portion 97) to the reactor vessel main body 62 with a nickel-base alloy material in a state where the in-core instrumentation cylinder 95 is fit into the mounting hole 96 of the reactor vessel main body 62.

Therefore, tensile stress may remain in the in-core instrumentation cylinder 95, the groove welded portion 97, and its peripheral portions, and a probability of occurrence of stress corrosion cracking becomes high due to long-term use. Therefore, the tensile residual stress on the surface is improved into the compressive residual stress by a water jet peening (WJP) device as a reactor repair device, so that the stress corrosion cracking is prevented. The water jet peening device is to jet high-pressure water containing cavitation bubbles on a surface of a metal member in water to improve the tensile residual stress on the surface of the metal member into the compressive residual stress.

When the tensile residual stress on the surface of the lower end plate 66 is improved into the compressive residual stress by the water jet peening device, the water jet peening device is mounted to the instrumentation nozzle 83 (in-core instrumentation cylinder 95) and work is performed. The installation device of a reactor repair device and the method of the first embodiment are used to install the water jet peening device to the instrumentation nozzle 83 (in-core instrumentation cylinder 95).

Figure 11:
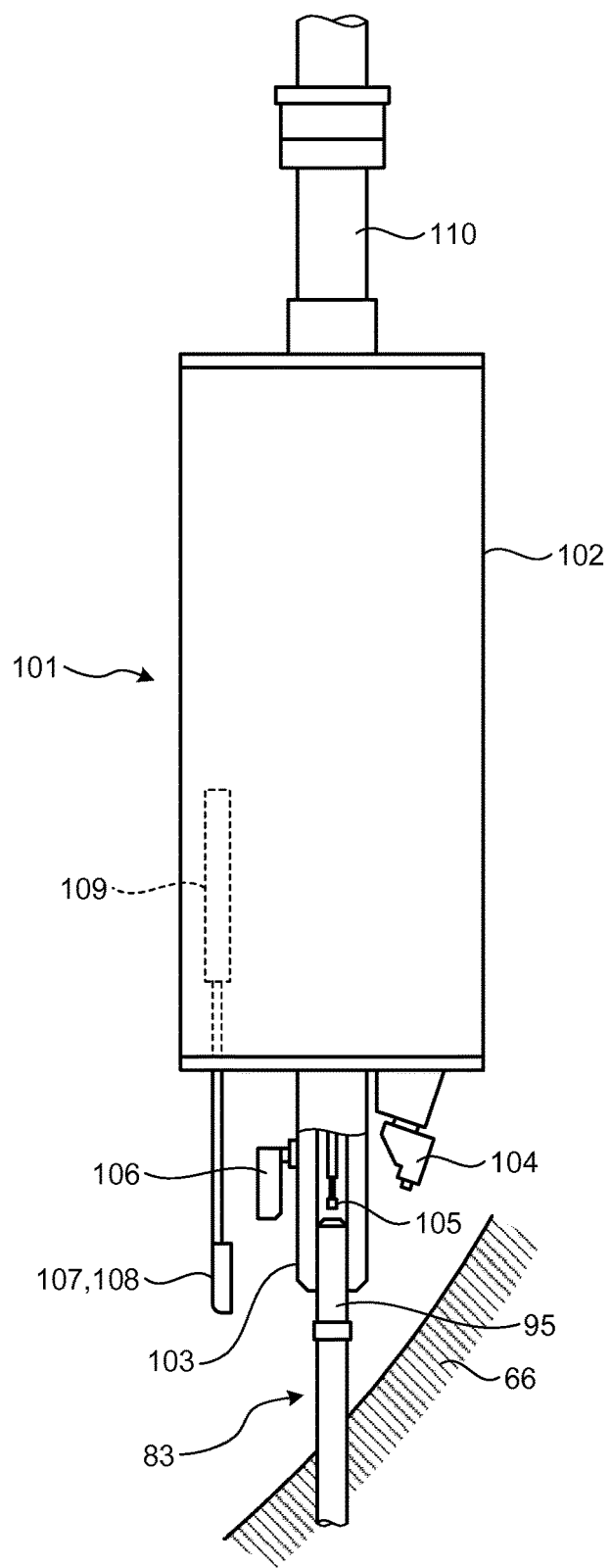
FIG. 11 is a front view illustrating a water jet peening device as a reactor repair device.
Figure 12:
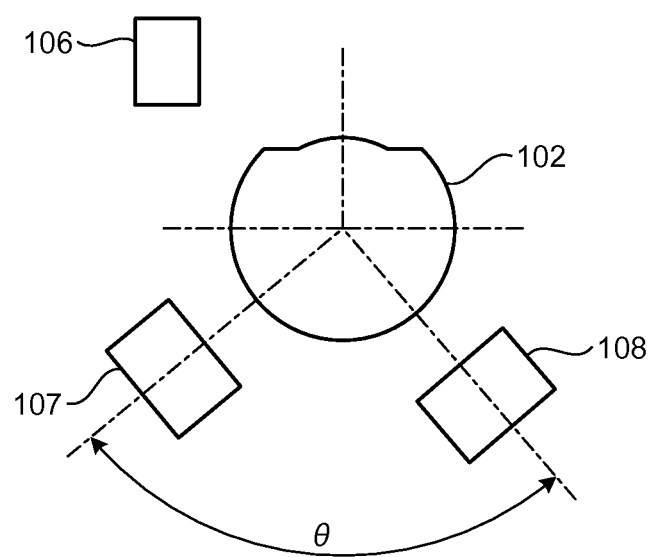
FIG. 12 is a schematic view illustrating arrangement of cameras with respect to the water jet peening device.

FIG. 11 is a front view illustrating a water jet peening device as a reactor repair device, and FIG. 12 is a schematic view illustrating arrangement of cameras with respect to the water jet peening device.

As illustrated in FIGS. 11 and 12, a water jet peening device 101 includes a device main body 102, a clamping device 103, an outer surface WJP nozzle 104, and an inner surface WJP nozzle 105. The clamping device 103 is arranged to downwardly protrude from a lower portion of the device main body 102, and fixes the device main body 102 to the instrumentation nozzle 83 by being fit into and clamping an outer peripheral surface of the in-core instrumentation cylinder 95. The outer surface WJP nozzle 104 jets tensile high-pressure water to the inner surface of the lower end plate 66 and the groove welded portion 97. The inner surface WJP nozzle 105 jets the tensile high-pressure water to an inner surface of the in-core instrumentation cylinder 95.

In this case, the outer surface WJP nozzle 104 and the inner surface WJP nozzle 105 can be moved up and down with respect to the device main body 102 and can be rotated in a peripheral direction, and can jet high-pressure water to predetermined regions of the lower end plate 66, the groove welded portion 97, and the in-core instrumentation cylinder 95.

Further, the water jet peening device 101 is provided with an execution monitoring camera 106, and device positioning cameras 107 and 108 to the device main body 102. The execution monitoring camera 106 is fixed to the device main body 102, can be rotated with a horizontal support shaft, and can change a capturing direction.

The device positioning cameras 107 and 108 are arranged in positions separated by a predetermined angle $\theta$ (for example, 90 degrees) in the horizontal direction, and include illumination. The device positioning cameras 107 and 108 can be lifted with respect to the device main body 102 by a lift cylinder 109, and can be moved to a lowered position at the time of positioning the water jet peening device 101 and to a rising position at the time of work of the water jet peening device 101.

A connecting shaft 110 is fixed on an upper portion of the device main body 102 of the water jet peening device 101, and can connect an installation pole (installation jig) described below.

Figure 1:
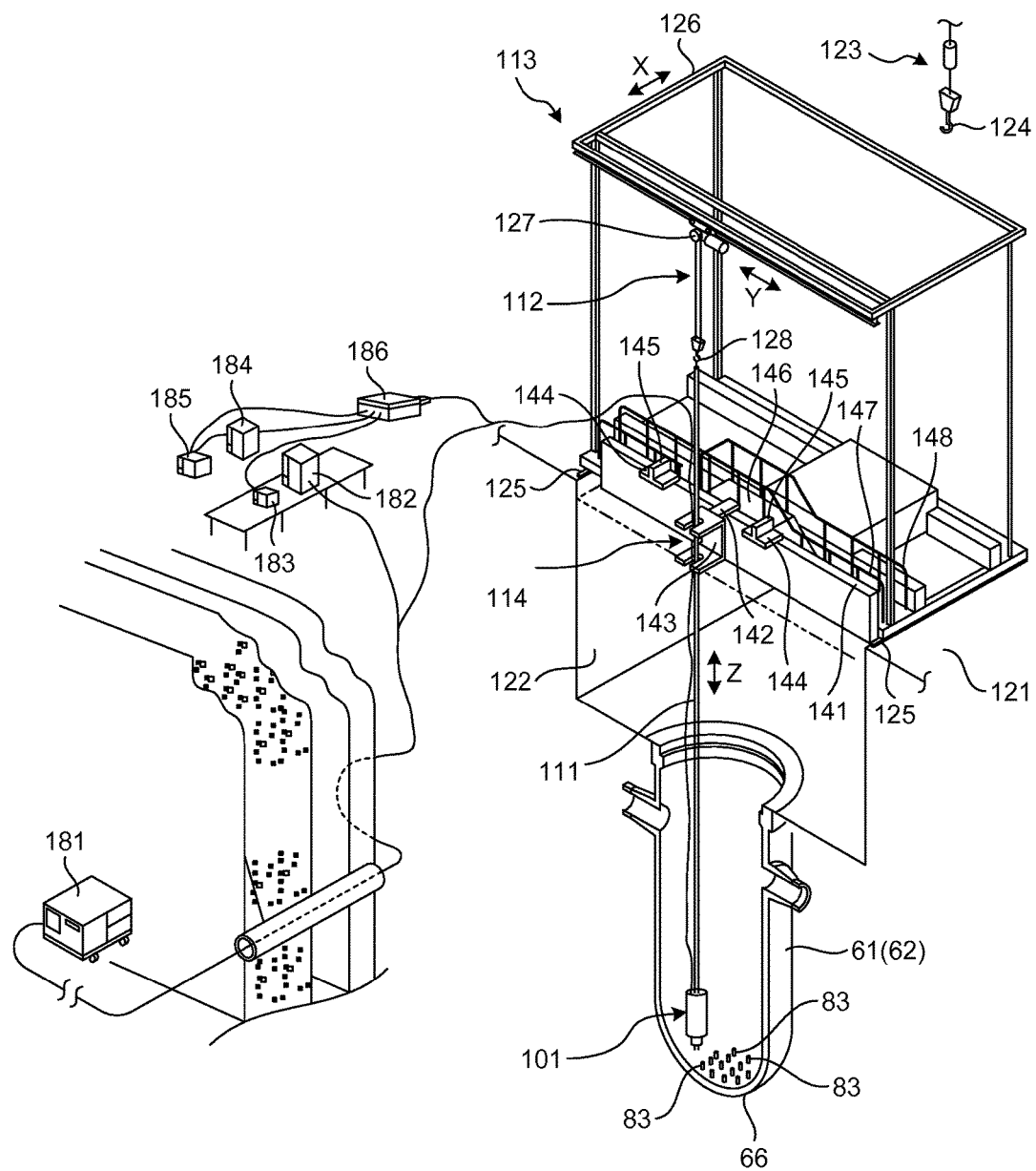
FIG. 1 is a schematic diagram illustrating an entire configuration of an installation device of a reactor repair device according to a first embodiment of the present invention.
Figure 2:
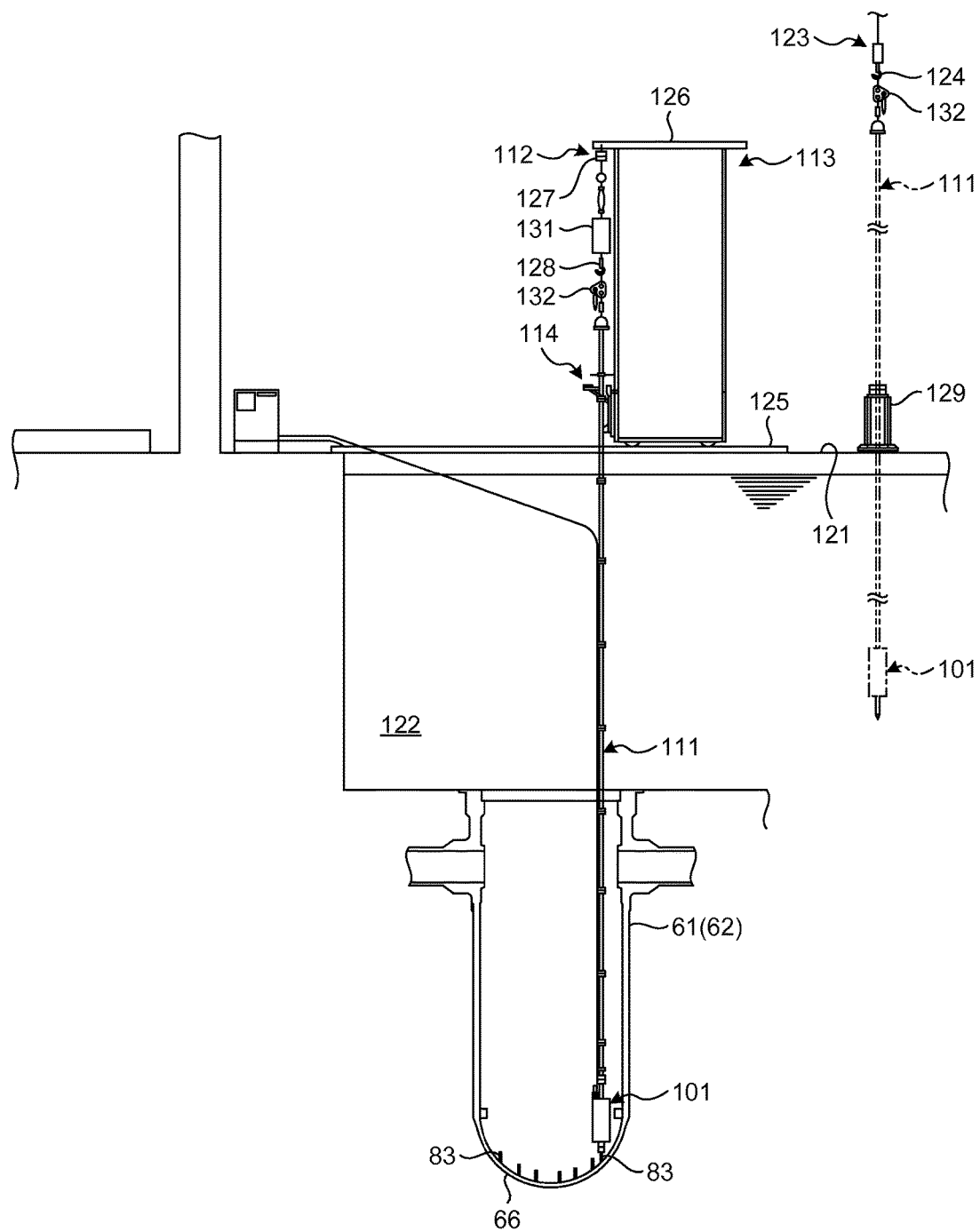
FIG. 2 is a schematic diagram illustrating the installation device of a reactor repair device of the first embodiment.
Figure 3:
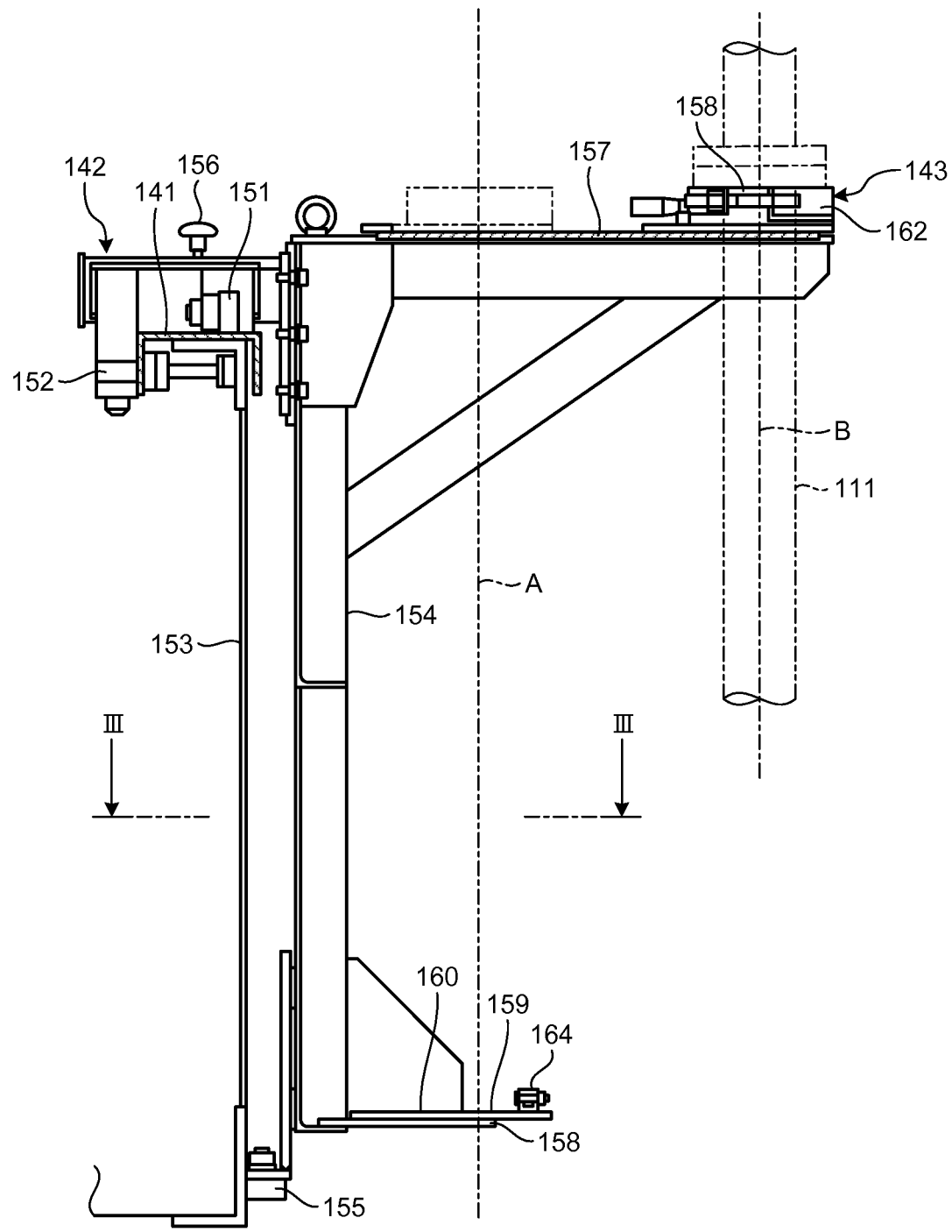
FIG. 3 is a front view of a positioning frame.
Figure 4:
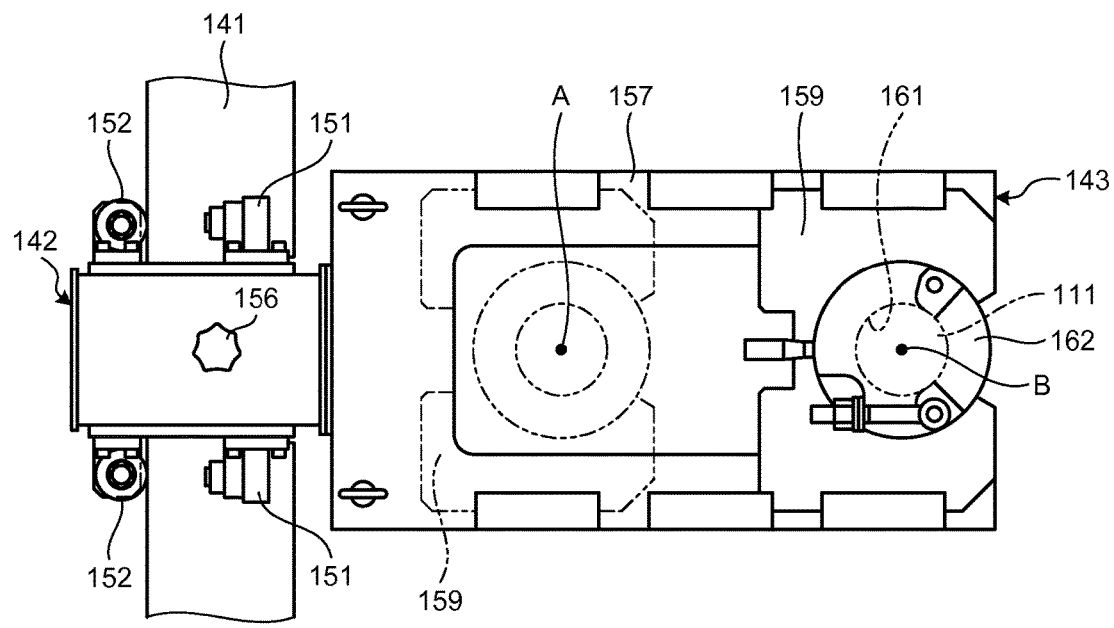
FIG. 4 is a plan view of the positioning frame.
Figure 5:
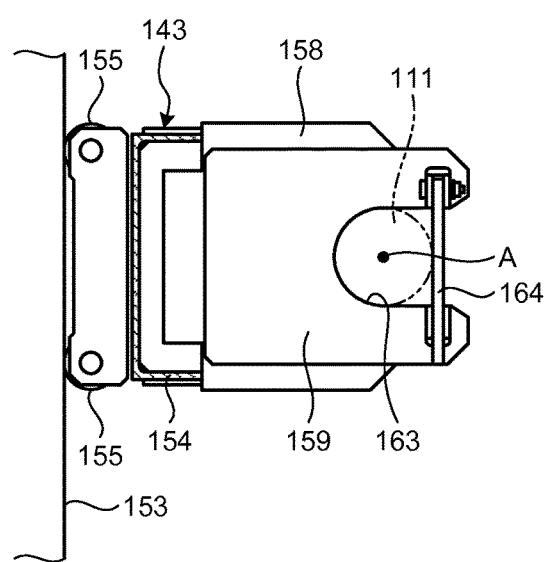
FIG. 5 is a III-III cross-sectional view of FIG. 3.
Figure 6:
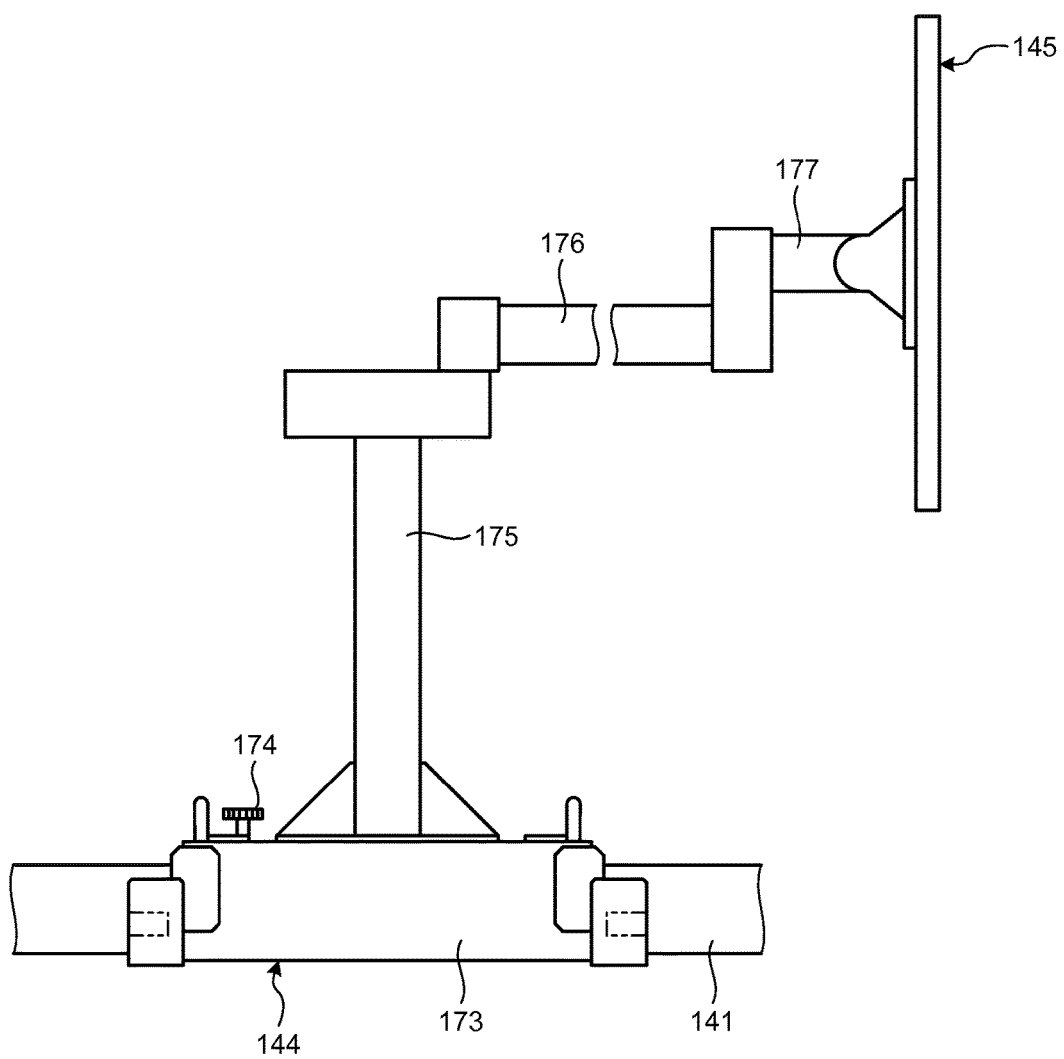
FIG. 6 is a front view of a monitor frame.
Figure 7:
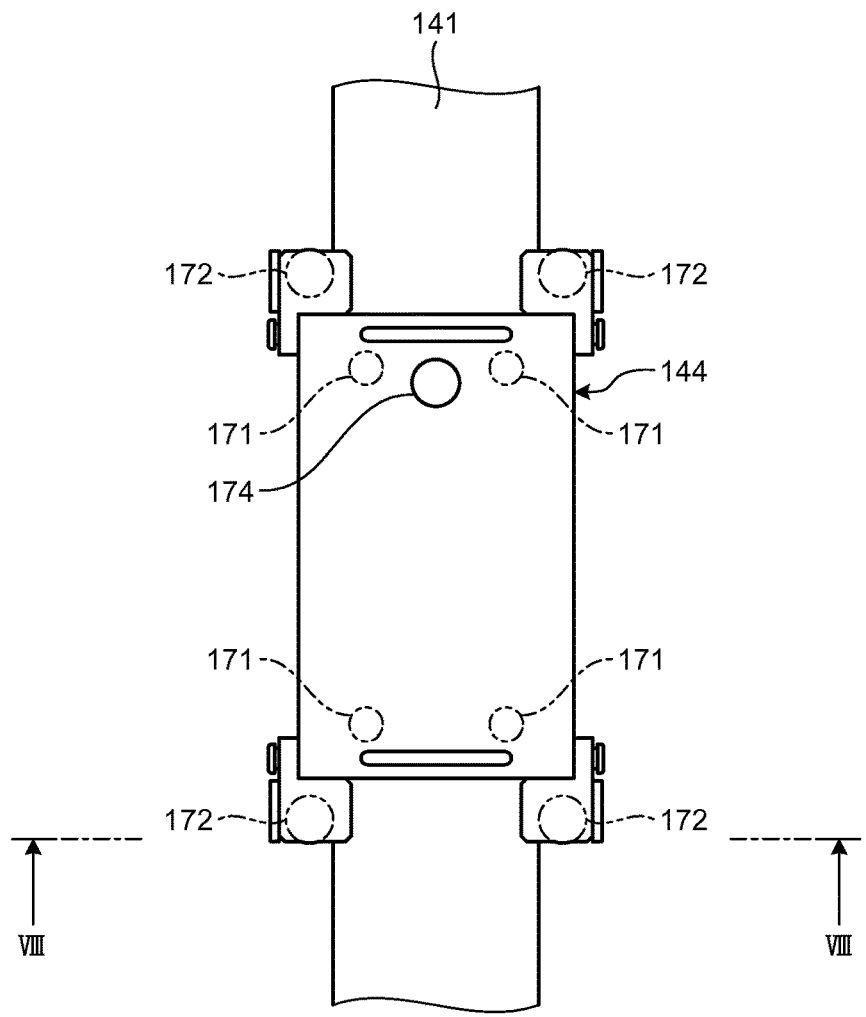
FIG. 7 is a plan view of the monitor frame.
Figure 8:
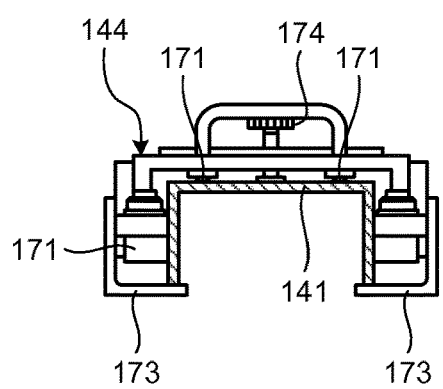
FIG. 8 is a VIII-VIII cross-sectional view of FIG. 7.
Figure 9:
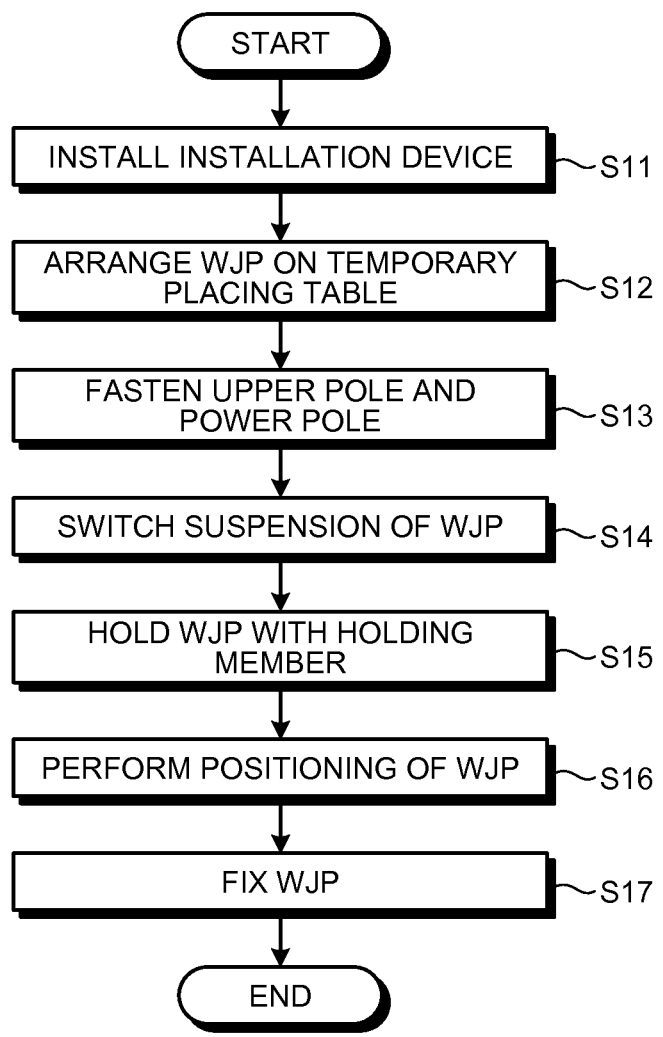
FIG. 9 is a flowchart illustrating a method of installing an installation device of a reactor repair device.
Figures 1, 10:
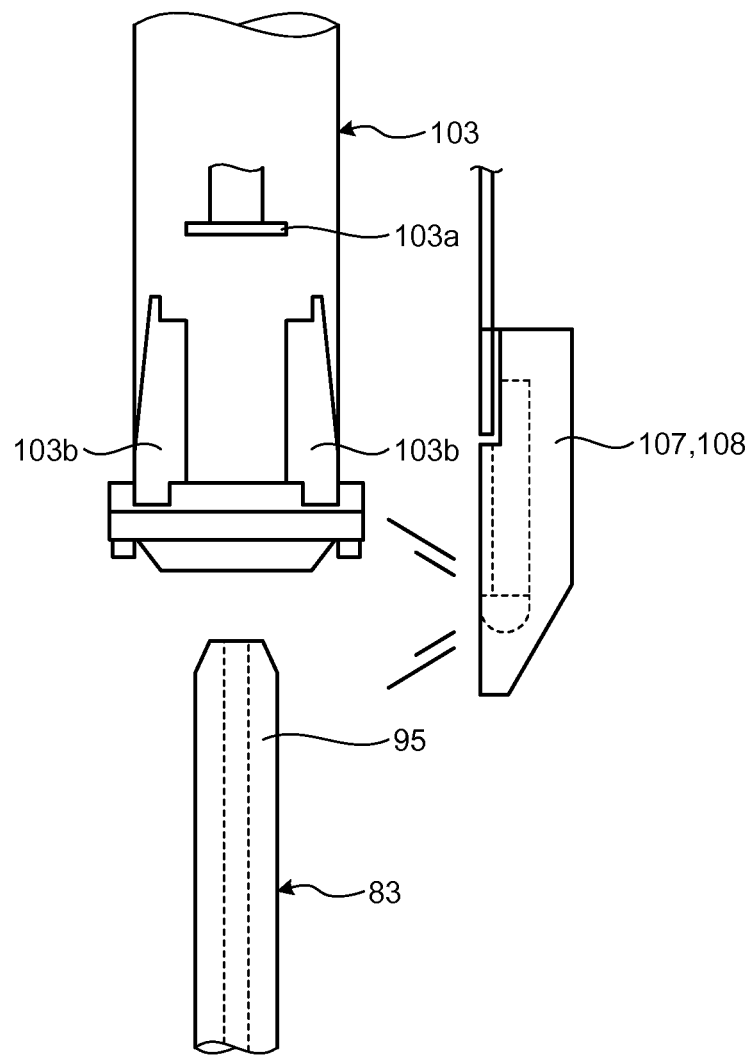
Figures 2, 10:
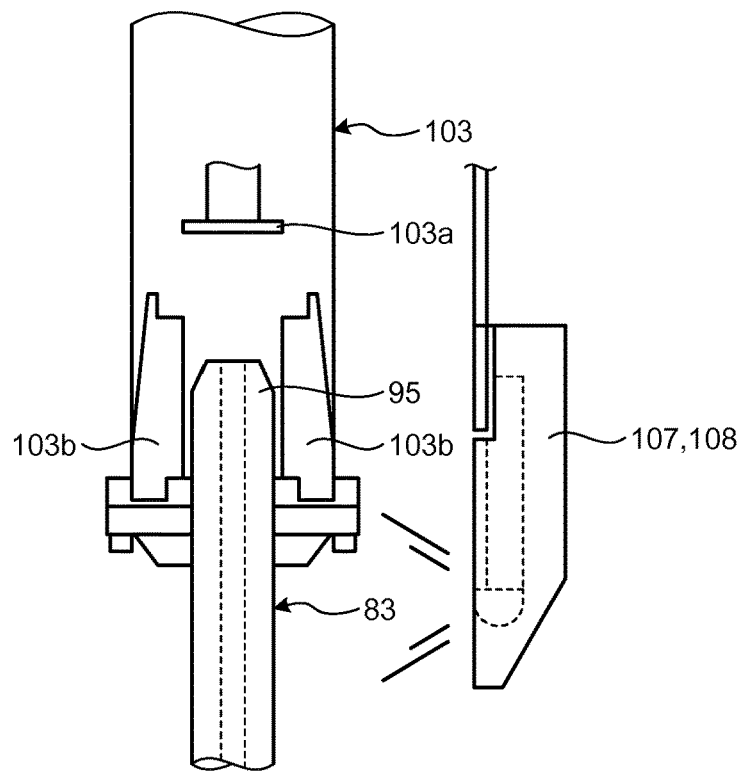
Figures 3, 10:
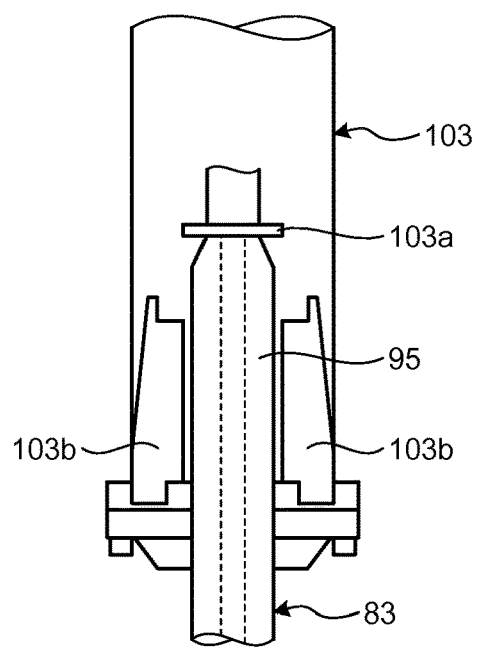
Figures 4, 10:
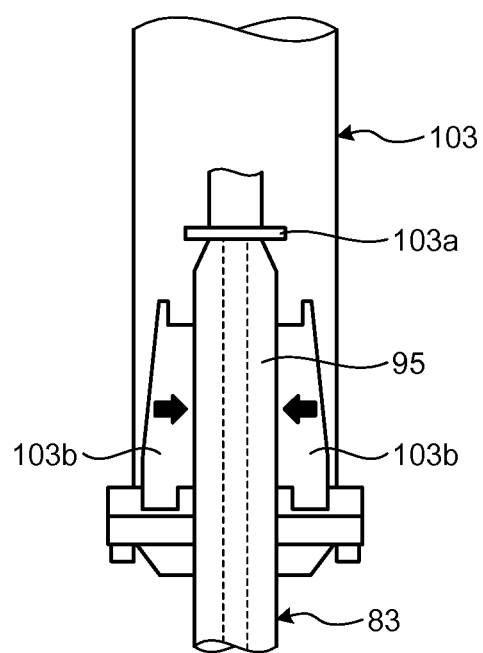

FIG. 1 is a schematic diagram illustrating an entire configuration of an installation device of a reactor repair device according to the first embodiment of the present invention, FIG. 2 is a schematic diagram illustrating the installation device of a reactor repair device of the first embodiment, FIG. 3 is a front view of a positioning frame, FIG. 4 is a plan view of the positioning frame, FIG. 5 is a III-III cross-sectional view of FIG. 3, FIG. 6 is a front view of a monitor frame, FIG. 7 is a plan view of the monitor frame, FIG. 8 is a VIII-VIII cross-sectional view of FIG. 7, FIG. 9 is a flowchart illustrating a method of installing an installation device of a reactor repair device, and FIGS. 10-1 to 10-4 are schematic diagrams illustrating a method of positioning a horizontal position of a reactor repair device.

The installation device of a reactor repair device of the first embodiment installs the water jet peening device 101 as the reactor repair device to the instrumentation nozzle 83 (in-core instrumentation cylinder 95) provided in the lower end plate (hemispherical portion) 66 of the reactor vessel 61 (reactor vessel main body 62). The installation device of the reactor repair device includes an installation pole 111, a lifting device 112, a moving device 113, and a position adjustment device 114.

In an atomic power plant, as illustrated in FIGS. 1 and 2, a reactor building (not illustrated) is provided with a work floor 121. A cavity 122 is provided below the work floor 121, and cooling water is stored in the cavity 122. The reactor vessel 61 is arranged inside the cavity 122, and is suspended and supported.

The reactor building is provided with an overhead crane (first lifting device) 123, and the overhead crane 123 can move and lift a hook 124 in two directions intersecting in the horizontal direction. Further, in the reactor building, a pair of guide rails 125 is laid and provided on both sides of the cavity 122, and a mobile crane (moving device 113) 126 is supported in a freely movable manner. The mobile crane 126 is provided with an electric hoist (lifting device 112, a second lifting device) 127 freely movable in an X direction in the horizontal direction, and freely movable in a Y direction intersecting with (perpendicular to) the X direction in the horizontal direction. Then, the electric hoist 127 includes a hook 128 that can be lifted in a Z direction along a vertical direction.

The installation pole 111 is a long member and has a predetermine length, and a connecting shaft 110 of the water jet peening device 101 can be connected to a lower end portion of the installation pole 111. In this case, the work floor 121 is provided with a temporary placing frame 129 that suspends and supports a flange portion of the connecting shaft 110. Further, the connecting shaft 110 of the water jet peening device 101 is provided with a plurality of swing bolts. Therefore, the flange portion of the connecting shaft 110 is suspended and supported by the temporary placing frame 129, a lower flange portion of the installation pole 111 is placed on the flange portion, and these flange portions can be fastened with the plurality of swing bolts. Further, the installation pole 111 is configured from a plurality of divided poles, and can allow the flange portions to adhere to each other and fasten the flange portions with the plurality of swing bolts in a similar manner.

An air balancer 131 and a suspension switch metal fitting 132 are connected to an upper portion of the installation pole 111. The air balancer 131 reduces the weight of the installation pole 111, the water jet peening device 101, and the like. That is, the air balancer 131 is connected with the installation pole 111 and the water jet peening device 101 and includes a piston freely movable up and down, so that an upper chamber and a lower chamber are divided. Therefore, the air balancer 131 can reduce the weight by providing, to the lower chamber, pressure corresponding to the weight of the installation pole 111 and the water jet peening device 101, and can slowly lower the water jet peening device 101 by adjusting the pressure.

The suspension switch metal fitting 132 includes a plurality of (three in the present embodiment) suspension holes (suspension portions), and switches suspension of the suspended and supported installation pole 111, the water jet peening device 101, and the like, from the overhead crane 123 to the moving device 113 (electric hoist 127). That is, first, the installation pole 111 and the water jet peening device 101 are connected to a first suspension hole of the suspension switch metal fitting 132, a second suspension hole is hooked with a hook 124 of the overhead crane 123, and the water jet peening device 101 is suspended by the overhead crane 123 through the installation pole 111. Under this state, the water jet peening device 101 is moved to a vicinity of the mobile crane 126 by the overhead crane 123, a third suspension hole is hooked with a hook 128 of the mobile crane 126, and the hook 128 is raised and the hook 124 is lowered, so that suspension of the water jet peening device 101 is switched from the overhead crane 123 to the mobile crane 126.

Here, the position adjustment device 114 will be described in detail. The position adjustment device 114 adjusts the position of the water jet peening device 101 in the Y direction by slightly moving the installation pole 111 in the horizontal direction (the Y direction in the present embodiment) in a state where the water jet peening device 101 is suspended and supported by the mobile crane 126 (electric hoist 127) through the installation pole 111. In this case, the position adjustment device 114 moves and adjusts the water jet peening device 101 by supporting a portion that is an upper portion of the installation pole 111 in a longitudinal direction, and is lower than a supported position by the hook 128.

While the mobile crane 126 is electrically movable in the X direction along the guide rails 125, the electric hoist 127 is movable in the Y direction by a chain operation of the operator. Therefore, highly precise position adjustment of the water jet peening device 101 in the Y direction is difficult. Therefore, the position adjustment device 114 is slightly moved along the Y direction, thereby to slightly move the water jet peening device 101 and to enable the highly precise position adjustment.

The position adjustment device 114 includes a guide rail 141 laid and provided to the mobile crane 126 along the Y direction, a first moving body 142 freely movable along the guide rail 141, and a holding member 143 provided on the first moving body 142 and which can hold the installation pole 111. Further, the position adjustment device 114 includes the device positioning cameras 107 and 108 provided in the water jet peening device 101, second moving bodies 144 freely movable along the guide rail 141, and monitors 145 provided on the second moving bodies 144 and which can display pictures of the device positioning cameras 107 and 108. In this case, in the position adjustment device 114, the holding member 143 is arranged on the guide rail 141 through the first moving body 142, and the monitors 145 are respectively arranged on both sides of the holding member 143 through the second moving bodies 144.

That is, a passage 146 on which the operator can walk is provided along the Y direction of the mobile crane 126, and handrails 147 and 148 are provided on both sides of the passage 146. The guide rail 141 is fixed in front of the passage 146 along the Y direction.

Then, as illustrated in FIGS. 3 to 5, the first moving body 142 is provided with a pair of first support rollers 151 on end portions of the guide rail 141 on a longitudinal direction side. The first support rollers 151 are freely rollable on an upper surface. Further, the first moving body 142 is provided with a pair of second support rollers 152 on end portions of the guide rail 141 on a rear portion side and on a longitudinal direction side. The second support rollers 152 are freely rollable on a side surface. A support wall 153 extending downward is fixed to the guide rail 141. The first moving body 142 is connected with a connecting member 154 extending downward, on a front portion side, and the connecting member 154 is provided with a pair of third support rollers 155 freely rollable on the support wall 153. Further, the first moving body 142 is provided with a stopper 156 in a freely rotatable manner, and can bring a tip portion of the stopper 156 in contact with the upper surface of the guide rail 141 by rotation of the stopper 156.

Therefore, the first moving body 142 can be moved in the Y direction by rolling of the first support rollers 151 and the second support rollers 152 on the guide rail 141, and rolling of the third support roller 155 on the support wall 153, and the stopper 156 is rotated and the tip portion is brought in contact with the upper surface of the guide rail 141 at a predetermined position, so that the first moving body 142 can be fixed to the position.

The holding member 143 is fixed to the connecting member 154 in the first moving body 142. The holding member 143 is provided with an upper support piece 157 and a lower support piece 158 formed in the horizontal direction. The upper support piece 157 is provided with an upper holding portion 159, and the lower support piece 158 is provided with a lower holding portion 160. The upper holding portion 159 is supported by the upper support piece 157 along the Y direction in a freely movable manner, and includes an engagement recess portion 161 and a hook 162. The engagement recess portion 161 can engage the installation pole 111, and the hook 162 can hook the installation pole 111 to the engagement recess portion 161. The lower holding portion 160 includes an engagement recess portion 163 and a hook 164. The engagement recess portion 163 is fixed to the lower support piece 158 and can engage the installation pole 111, and the hook 164 can hook the installation pole 111 to the engagement recess portion 163.

Therefore, in the holding member 143, the upper holding portion 159 and the lower holding portion 160 can hold the installation pole 111 at the A position, and only the upper holding portion 159 can hold the installation pole 111 at the B position. In this case, the A position is a position where the position in the Y direction of the water jet peening device 101 can be adjusted through the installation pole 111, and the B position is an execution position of water jet peening by the water jet peening device 101.

Further, as illustrated in FIGS. 6 to 8, the second moving body 144 is provided with a plurality of first support rollers 171 at lower portions. The first support rollers 171 are freely rollable on the upper surface of the guide rail 141. Further, the second moving body 144 is provided with a plurality of second support rollers 172 at end portions of the guide rail 141 on the longitudinal direction side. The second support rollers 172 are freely rollable on the side surfaces. The second moving body 144 is provided with a pair of freely engageable engagement pieces 173 on both side portions of the guide rail 141. Further, the second moving body 144 is provided with a stopper 174 in a freely rotatable manner, and can bring a tip portion of the stopper 174 in contact with the upper surface of the guide rail 141 by rotation of the stopper 174.

Therefore, the second moving body 144 can be moved in the Y direction by rolling of the first support rollers 171 and the second support rollers 172 on the guide rail 141, and by engagement of the engagement pieces 173 with both side portions of the guide rail 141. The stopper 174 is rotated and the tip portion is brought in contact with the upper surface of the guide rail 141 at a predetermined position, so that the second moving body 144 can be fixed to the position.

The second moving body 144 supports the monitor 145 through a plurality of support members 175, 176, and 177. The monitor 145 is arranged to face the side of the holding member 143 supported by the first moving body 142.

A method of installing a reactor repair device by the installation device of a reactor repair device configured as described above includes a step of suspending and supporting the upper portion of the installation pole 111 connected to the upper portion of the water jet peening device 101 from the work floor 121, a step of performing temporal positioning of the water jet peening device 101 with respect to the instrumentation nozzle 83 by moving the installation pole 111 in the two directions intersecting in the horizontal direction, a step of performing actual positioning of the water jet peening device 101 with respect to the instrumentation nozzle 83 by slightly moving the installation pole 111 in the horizontal direction, and a step of mounting the water jet peening device 101 to the instrumentation nozzle 83 by lowering the water jet peening device 101 through the installation pole 111.

Further, the method of installing a reactor repair device successively performs the actual positioning and mounting of the water jet peening device 101 with respect to the instrumentation nozzle 83 by slightly moving the water jet peening device 101 in the horizontal direction while lowering the water jet peening device 101.

Further, the method of installing a reactor repair device suspends and supports the water jet peening device 101 with the overhead crane 123 through the installation pole 111, moves the water jet peening device 101 to the predetermined position, and then switches the suspension of the installation pole 111 to the mobile crane 126 (electric hoist 127) while keeping the water jet peening device 101 supported by the overhead crane 123 through the installation pole 111.

That is, in the method of installing a reactor repair device, as illustrated in FIGS. 1, 2, and 9, at step S11, the lifting device 112, the moving device 113, and the position adjustment device 114 as the installation device are installed on the work floor 121. Further, a high-pressure water pump 181, a WJP operation board 182, a monitor television 183, a power supply box 184, a free board 185, and a relay box 186 are installed on the work floor 121, and are connected to the water jet peening device 101.

At step S12, the water jet peening device 101 is moved by the overhead crane 123 and is arranged on the temporary placing frame 129. At step S13, the installation pole 111 is moved by the overhead crane 123, and is placed on the water jet peening device 101 supported by the temporary placing frame 129, and the installation pole 111 and the water jet peening device 101 are fastened. Then, at step S14, the installation pole 111 and the water jet peening device 101 are suspended and supported by the overhead crane 123 through the suspension switch metal fitting 132, and are moved to a vicinity of the mobile crane 126. Then, the hook 128 of the mobile crane 126 is hooked with the suspension switch metal fitting 132, and the hook 128 of the mobile crane 126 is raised and the hook 124 of the overhead crane 123 is lowered. Then, the suspension switch metal fitting 132 comes off the hook 124 of the overhead crane 123, and the mobile crane 126 suspends and supports the installation pole 111 and the water jet peening device 101 through the suspension switch metal fitting 132.

At step S15, the mobile crane 126 is horizontally moved, so that the water jet peening device 101 is held with the holding member 143 through the installation pole 111. Then, at step S16, the positioning of the water jet peening device 101 is performed. That is, first, the installation pole 111 is moved in the X direction and the Y direction by the overhead crane 123, so that the temporal positioning of the water jet peening device 101 with respect to the instrumentation nozzle 83 is performed. At this time, the operator works while seeing the pictures of the device positioning cameras 107 and 108 on the two monitors 145.

Next, the first moving body 142 is moved in a state where the water jet peening device 101 is suspended and supported by the overhead crane 123 through the installation pole 111, and the holding member 143 is slightly moved in the Y direction, so that the actual positioning of the water jet peening device 101 with respect to the instrumentation nozzle 83 is performed. At this time, the operator operates the electric hoist 127 to lower the water jet peening device 101 to above the instrumentation nozzle 83 through the installation pole 111, and slightly moves the water jet peening device 101 in the Y direction while slightly lowering the water jet peening device 101, using the air balancer 131, thereby to fit the water jet peening device 101 to the instrumentation nozzle 83.

In this case, first, as illustrated in FIG. 10-1, the operator lowers the device positioning cameras 107 and 108 together with the water jet peening device 101, and performs position adjustment while seeing the monitors 145. Then, as illustrated in FIG. 10-2, the operator lowers the water jet peening device 101, and fits the clamping device 103 to the outer peripheral surface of the in-core instrumentation cylinder 95 in the instrumentation nozzle 83. Following that, as illustrated in FIG. 10-3, the operator lowers the water jet peening device 101, and when a positioning member 103a of the clamping device 103 comes in contact with the upper end portion of the in-core instrumentation cylinder 95, the operator stops the lowering of the water jet peening device 101. Then, as illustrated in FIG. 10-4, the operator inwardly moves a plurality of clump members 103b, so that the in-core instrumentation cylinder 95 is held by the clamping device 103.

Here, the water jet peening device 101 can be mounted to the instrumentation nozzle 83 by the clamping device 103, and at step S17, the first moving body 142 is fixed to the guide rail 141, so that fixation of the water jet peening device 101 is completed. Therefore, in this state, the water jet peening by the water jet peening device 101 can be performed for the inner surface of the lower end plate 66 and the groove welded portion 97.

As described above, in the installation device of a reactor repair device of the first embodiment, the installation pole 111 connected with the upper portion of the water jet peening device 101, the lifting device 112 that can suspend and support the upper portion of the installation pole 111 from the work floor 121 and can lift the installation pole 111, the moving device 113 that can move the lifting device 112 in the two directions intersecting in the horizontal direction, and the position adjustment device 114 that can be moved in the horizontal direction in a state where the installation pole 111 is supported by the lifting device 112.

Therefore, the water jet peening device 101 is suspended and supported by the lifting device 112 through the installation pole 111 connected to the upper portion, and is temporarily positioned by being lowered by the lifting device 112 and being moved by the moving device 113 in the horizontal direction. Finally, the water jet peening device 101 is actually positioned by being moved in the horizontal direction by the position adjustment device 114 in a state where the installation pole 111 is supported by the lifting device 112. Following that, the water jet peening device 101 is lowered to be installed to the instrumentation nozzle 83. Therefore, the water jet peening device 101 can be easily mounted to the predetermined position from the upper work floor 121, and the workability can be improved.

In the installation device of a reactor repair device of the first embodiment, the position adjustment device 114 causes the installation pole 111 to be movable by supporting a portion that is lower than the supported position of the installation pole 111 by the lifting device 112. Therefore, the portion of the installation pole 111, which is lower than the supported position of the installation pole 111 by the lifting device 112, is supported and moved, and the positioning of the water jet peening device 101 is performed. Therefore, the water jet peening device 101 is positioned in a state where the weight is supported by the lifting device 112, whereby dropping of the water jet peening device 101 and the like can be prevented, and safety can be improved.

In the installation device of a reactor repair device of the first embodiment, the air balancer 131 that reduces the weight of the water jet peening device 101 is provided to the installation pole 111. Therefore, the weight of the water jet peening device 101 is reduced by the air balancer 131, so that the water jet peening device 101 can be slightly lowered, collision of the water jet peening device 101 and the instrumentation nozzle 83 is prevented, and the water jet peening device 101 can be appropriately installed to the instrumentation nozzle 83.

In the installation device of a reactor repair device of the first embodiment, the suspension switch metal fitting 132 that includes a plurality of suspension portions and switches the suspension of the water jet peening device 101 suspended and supported through the installation pole 111 to the lifting device 112 is provided to the installation pole 111. Since the plurality of suspension portions is provided in the suspension switch metal fitting 132, when suspension of the water jet peening device 101 is switched from the overhead crane 123 to the electric hoist 127, the weight of the water jet peening device 101 can be supported by both of the overhead crane 123 and the electric hoist 127 by the suspension switch metal fitting 132, whereby dropping of the water jet peening device 101 and the like are prevented, and safety can be improved.

In the installation device of a reactor repair device of the first embodiment, the position adjustment device 114 includes the guide rail 141 laid and provided to the mobile crane 126 along the Y direction, the first moving body 142 freely movable along the guide rail 141, and the holding member 143 provided to the first moving body 142 and which can hold the installation pole 111. Since the holding member 143 that can hold the installation pole 111 is freely movable by the guide rail 141 along the Y direction through the first moving body 142, the operator can perform positioning of the water jet peening device 101 only by moving the first moving body 142, and the workability can be improved.

In the installation device of a reactor repair device of the first embodiment, the holding member 143 can hold two places of the installation pole 111 in the longitudinal direction. Therefore, the holding member 143 can suppress a tilt of the installation pole 111 and can perform stable positioning of the water jet peening device 101.

In the installation device of a reactor repair device of the first embodiment, the position adjustment device 114 includes the device positioning cameras 107 and 108 that can capture repair work by the water jet peening device 101, the second moving bodies 144 freely movable along the guide rail 141, and the monitors 145 provided on the second moving bodies 144 and which can display the pictures of the device positioning cameras 107 and 108. Since the monitors 145 on which the positioning work by the water jet peening device 101 is displayed are freely movable in the Y direction through the second moving bodies 144, the operator can perform positioning of the water jet peening device 101 while moving the monitors 145 to appropriate positions with the second moving bodies 144, and the workability can be improved.

In the installation device of a reactor repair device of the first embodiment, the temporary placing frame 129 that suspends and supports the upper portion of the water jet peening device 101 is provided. Therefore, the installation pole 111 can be connected in a state where the upper portion of the water jet peening device 101 is suspended and supported by the temporary placing frame 129, and the long installation pole 111 and the water jet peening device 101 can be easily conveyed into the reactor.

Further, the method of installing a reactor vessel of the first embodiment includes the step of suspension and supporting the upper portion of the installation pole 111 connected to the upper portion of the water jet peening device 101 from the work floor 121, the step of performing temporal positioning of the water jet peening device 101 with respect to the instrumentation nozzle 83 by moving the installation pole 111 in the two directions intersecting in the horizontal direction, the step of performing actual positioning of the water jet peening device 101 with respect to the instrumentation nozzle 83 by slightly moving the installation pole 111 in the horizontal direction, and the step of mounting the water jet peening device 101 to the instrumentation nozzle 83 by lowering the water jet peening device 101 through the installation pole 111.

Therefore, the positioning can be performed by moving the water jet peening device 101 in the horizontal direction, and the water jet peening device 101 can be installed to the instrumentation nozzle 83 by lowering the water jet peening device 101. Therefore, the water jet peening device 101 can be easily mounted to the predetermined position from the upper work floor 121, and the workability can be improved.

The method of installing a reactor vessel of the first embodiment successively performs the actual positioning and the mounting of the water jet peening device 101 to the instrumentation nozzle 83 by slightly moving the water jet peening device 101 in the horizontal direction while lowering the water jet peening device 101. Therefore, the water jet peening device 101 can be easily and highly precisely installed to the instrumentation nozzle 83.

The method of installing a reactor vessel of the first embodiment suspends and supports the water jet peening device 101 by the overhead crane 123 through the installation pole 111 and moves the water jet peening device 101 to the predetermined position, and then switches the suspension of the installation pole 111 to the electric hoist 127 while keeping the weight (load) of the water jet peening device 101 supported by the overhead crane 123 through the installation pole 111. Therefore, when the suspension of the water jet peening device 101 is switched from the overhead crane 123 to the electric hoist 127, the suspension of the water jet peening device 101 is switched to the electric hoist 127 while keeping the water jet peening device 101 supported by the overhead crane 123. Therefore, the weight of the water jet peening device 101 is supported by the two lifting devices at the same time, whereby the dropping of the water jet peening device 101 and the like are prevented, and safety can be improved.

Second Embodiment

Figure 16:
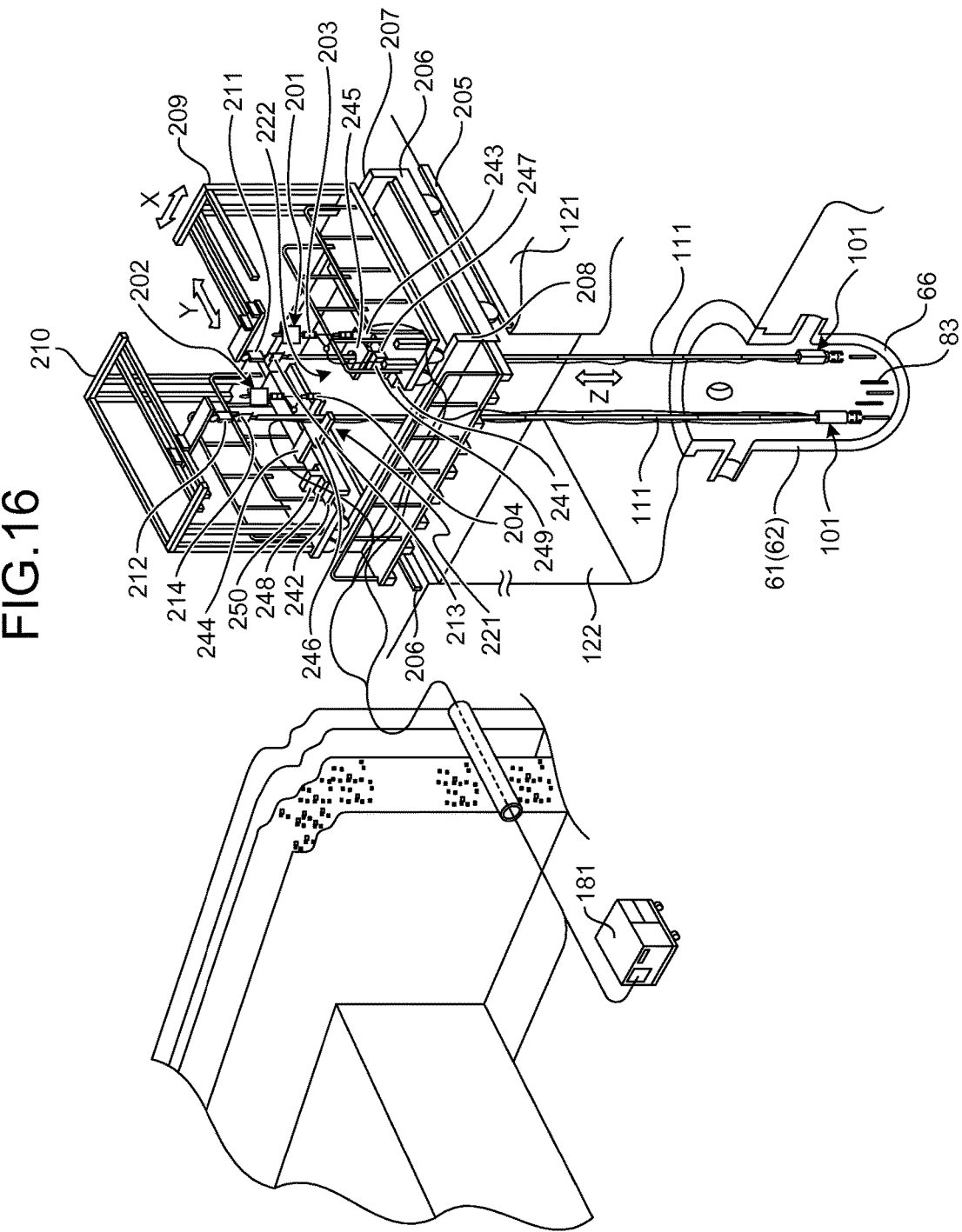
FIG. 16 is a schematic diagram illustrating an installation device of a reactor repair device according to a second embodiment of the present invention.

FIG. 16 is a schematic diagram illustrating an installation device of a reactor repair device according to a second embodiment of the present invention. Note that a member having a similar function to the above-described embodiment is denoted with the same reference sign, and detailed description is omitted.

In an atomic power plant, as illustrated in FIG. 16, a reactor building (not illustrated) is provided with a work floor 121 and a cavity 122 below the work floor 121, and cooling water is stored in the cavity 122. A reactor vessel 61 is arranged inside the cavity 122, and is suspended and supported.

The reactor building is provided with two sets of overhead cranes (first lifting device) 201 and 202, and can move hooks 203 and 204 in two directions intersecting in a horizontal direction and can lift the hooks 203 and 204. Further, in the reactor building, a pair of guide rails 205 and 206 is laid and provided on both sides of the cavity 122, and a first mobile crane 206 is supported in a Y direction in a freely movable manner. On the first mobile crane 206, a pair of guide rails 207 and 208 is laid and provided, and second mobile cranes 209 and 210 are supported in an X direction in a freely movable manner. Electric hoists 211 and 212 freely movable in the Y direction are provided to the second mobile cranes 209 and 210. Then, the electric hoists 211 and 212 include hooks 213 and 214 that can be lifted along a Z direction along a vertical direction.

An installation pole 111 is a long member and has a predetermined length, and a water jet peening device 101 can be connected to a lower portion of the installation pole 111. An air balancer and a suspension switch metal fitting are connected to an upper portion of the installation pole 111.

Position adjustment devices 221 and 222 adjust positions of the water jet peening devices 101 in the Y direction by slightly moving the installation poles 111 in a horizontal direction (the Y direction in the present embodiment) in a state where the water jet peening devices 101 are respectively suspended and supported by the respective second mobile cranes 209 and 210 (the electric hoists 211 and 212) through the installation poles 111.

That is, the position adjustment devices 221 and 222 include guide rails 241 and 242 laid and provided to the second mobile cranes 209 and 210 along the Y direction, first moving bodies 243 and 244 freely movable along the guide rails 241 and 242, and holding members 245 and 246 provided to the first moving bodies 243 and 244 and which can hold the installation poles 111. Further, the position adjustment devices 221 and 222 include second moving bodies 247 and 248 freely movable along the guide rails 241 and 242, and monitors 249 and 250 provided on the second moving bodies 247 and 248. In this case, in the position adjustment devices 221 and 222, the holding members 245 and 246 are arranged on the guide rails 241 and 242 through the first moving bodies 243 and 244, and the monitors 249 and 250 are arranged on both sides of the holding members 245 and 246 through the second moving bodies 247 and 248, respectively.

In the second embodiment, the two pairs (a plurality) of the overhead cranes 201 and 202, the second mobile cranes 209 and 210, the electric hoists 211 and 212, the position adjustment devices 221 and 222, and the like are arranged on the work floor 121 to face each other in the horizontal direction.

Therefore, by arranging the dedicated second mobile cranes 209 and 210, electric hoists 211 and 212, position adjustment devices 221 and 222, and the like on the work floor 121, the two water jet peening devices 101 are arranged inside the reactor vessel 61, and water jet peening for two places can be performed at the same time.

In the installation device of a reactor repair device of the second embodiment, the two pairs of the overhead cranes 201 and 202, the second mobile cranes 209 and 210, the electric hoists 211 and 212, and the position adjustment devices 221 and 222 are arranged on the work floor 121 to face each other in the horizontal direction.

Therefore, repair work can be performed in a plurality of places with the plurality of water jet peening devices 101 at the same time, and a work time can be shortened.

Note that the description has been given using the water jet peening device 101 as the reactor repair device in the embodiments. However, the reactor repair device is not limited to the device, and for example, a nozzle repair device, a nozzle exchange device, or the like may be used. Further, in the embodiments, the installation pole 111 has been used as an installation jig of the water jet peening device 101. However, the configuration is not limited to the embodiment, and for example, a wire, a cable, a rope, or the like may be used.

Further, in the embodiments, the description has been given in which the installation device of a reactor repair device of the present invention is applied to the pressure water reactor. However, the installation device of a reactor repair device of the present invention may be applied to a boiling water reactor.

REFERENCE SIGNS LIST

61 Reactor vessel
62 Reactor vessel main body

63 Reactor vessel head
66 Lower end plate (hemispherical portion)
83 Instrumentation nozzle
85 Conduit tube
88 Thimble tube
95 In-core instrumentation cylinder
101 Water jet peening device (reactor repair device)
102 Device main body
103 Clamping device
104 Outer surface WJP nozzle
105 Inner surface WJP nozzle
107 and 108 Device positioning camera
110 Connecting shaft
111 Installation pole (installation jig)
112 Lifting device
113 Moving device
114 Position adjustment device
121 Work floor
122 Cavity
123 Overhead crane (first lifting device)
126 Mobile crane
127 Electric hoist (second lifting device)
129 Temporary placing frame
131 Air balancer
132 Suspension switch metal fitting
141 Guide rail
142 First moving body
143 Holding member
144 Second moving body
145 Monitor

The invention claimed is:

1. A method of installing a reactor repair device to an instrumentation nozzle provided in a hemispherical portion of a reactor vessel, the method comprising the steps of:
   suspending and supporting an upper portion of an installation jig connected to an upper portion of the reactor repair device from a work floor;
   performing temporary positioning of the reactor repair device with respect to the instrumentation nozzle by moving the installation jig in a first and a second direction intersecting in a horizontal plane;
   performing actual positioning of the reactor repair device with respect to the instrumentation nozzle by moving the installation jig in the second direction; and
   mounting the reactor repair device to the instrumentation nozzle by lowering the reactor repair device connected with the installation jig,
   wherein the method further comprising:
   (i) suspending and supporting the reactor repair device 101 connected to the installation jig 111 by a first crane 123
   (ii) moving the reactor repair device 101 to a predetermined position, and
   (iii) switching suspension of the installation jig 111 to a second crane 127 while keeping a load of the reactor repair device 101 connected to the installation jig 111 supported by the first crane 123.

2. The method of installing a reactor repair device according to claim 1, the method comprising
   successively performing the actual positioning and the mounting of the reactor repair device with respect to the instrumentation nozzle by slightly moving the reactor repair device in the second direction while lowering the reactor repair device.

3. The method of installing a reactor repair device according to claim 1 wherein the step (iii) further comprising:
   iv) connecting the second crane with a suspension switch metal fitting that connects the first crane with the installation jig;
   v) lowering the first crane and raising the second crane; and
   vi) releasing the connection between the first crane and the suspension switch metal fitting.

\* \* \* \* \*